Patented Sept. 8, 1953

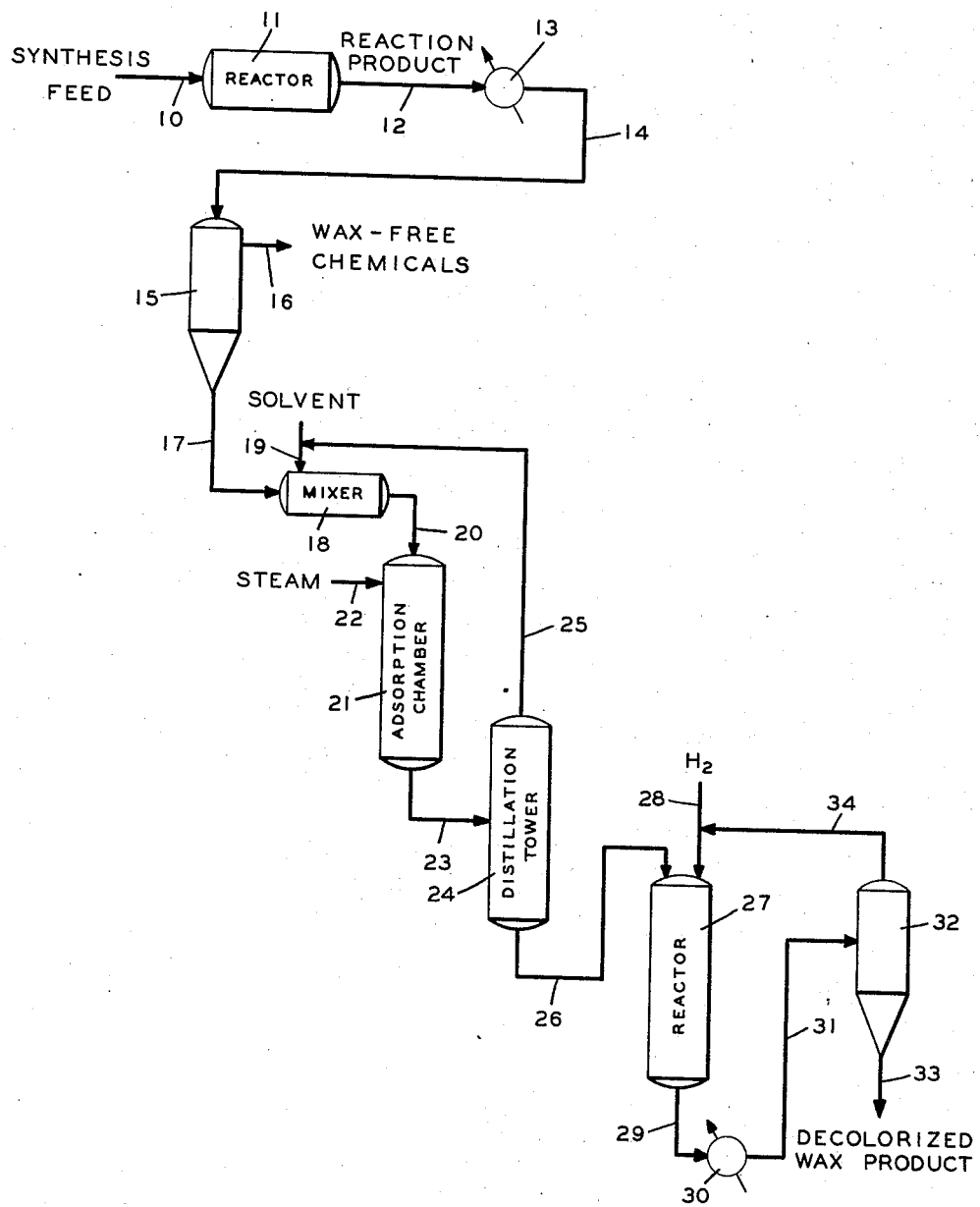

2,651,655

UNITED STATES PATENT OFFICE 2,651,655

TREATMENT OF HYDROCARBON WAXES

Robert T. Loughran, Jersey City, N. J., assignor to The M. W. Kellogg Company, Jersey City, N. J., a corporation of Delaware Application June 29, 1949, Serial No. 101,961

9 Claims. (Cl. 260—450)

This invention relates to the treatment of hydrocarbons and relates more particularly to the treatment of hydrocarbons to produce purified paraffin wax. Still more particularly, the invention relates to a method for refining the waxy product produced by the hydrogenation of oxides of carbon in the presence of a metallic catalyst, in which this waxy product contains color-imparting unsaturated hydrocarbons and color-imparting metallo-organic compounds.

In the hydrogenation of oxides of carbon at elevated temperatures with metallic catalysts, such as iron, cobalt, nickel or ruthenium, the waxy product thus produced may be highly colored by the presence of color-imparting unsaturated hydrocarbons comprising olefins, and possibly acetylenes, and color-imparting metalloorganic compounds. This waxy product is generally obtained by cooling the hot gaseous reaction effluent, as it comes from the reactor, to a temperature of approximately 300° F. in order to effect condensation of the waxes, while oxygenated organic compounds and other hydrocarbons are still maintained in the vapor state.

The composition of the waxes thus produced is dependent upon the operating conditions of the synthesis reaction, but they normally consist principally of aliphatic hydrocarbons, including for the most part normal and iso-paraffins and minor proportions of unsaturated hydrocarbons including normal olefins, although other unsaturated compounds such as acetylenes may also be present. The wax thus produced in the various hydrogenations of oxides of carbon, employing conventional hydrogenation catalysts such as iron, cobalt, nickel or ruthenium, supported or unsupported, may consist for the most part of solid paraffins comprising as much as 66% by weight of the total reaction product.

These waxes have been found highly useful in the manufacture of various products in which it is of commercial importance that they be obtained in a substantially color-free or clarified whitish appearance. However, it has been found that the above-described waxy product may contain in addition to paraffins (which are normally of a clear, whitish appearance), color-imparting unsaturated hydrocarbons and metallo-organic compounds. These color-imparting unsaturated compounds comprise for the most part normal olefins having from 18 to 30 carbon atoms per molecule, although other unsaturates such as acetylenes may also be present. The metalloorganic compounds generally comprise carbonyls, oxides or other metal-containing organic compounds, which are present in these waxy products by reason of contamination of the aforementioned reaction product by the catalyst and metallic apparatus employed. The methods employed heretofore in the purification of waxes, however, do not effect the removal of these color-imparting components to the extent necessary for rendering the wax fit for commercial use.

It is, therefore, an object of this invention to provide an improved method for the treatment of waxy products produced by the hydrogenation of oxides of carbon to produce purified paraffin wax.

Another object of the invention is to provide an improved method for treating waxy products produced by the hydrogenation of oxides of carbon and containing color-imparting unsaturated hydrocarbons and metallo-organic compounds.

Other objects and advantages inherent in the invention will become apparent to one skilled in the art, from the following more detailed description.

In accordance with the broad method of the present invention, a purified paraffin wax of improved color and having a clear whitish appearance, is obtained from waxy products produced by the hydrogenation of oxides of carbon and containing color-imparting unsaturated hydrocarbons and metallo-organic compounds, by dissolving the waxy product in a solvent, contacting the resulting solution at an elevated temperature with a solid adsorbent to separate from the solution the aforementioned color-imparting metalloorganic compounds, withdrawing the solution from contact with the adsorbent, and further decolorizing the thus partially decolorized wax product by hydrogenating the product in the presence of a hydrogenation catalyst under conditions such that unsaturated color-imparting hydrocarbons present (such as olefins and possibly acetylenes), are converted to their corresponding paraffins.

Specifically, the waxy product containing the aforementioned color-imparting impurities, is first diluted with a solvent. Suitable solvents include naphthas, such as a naphtha product of the process in which the waxy product originates, aromatics such as benzene or xylene, or a straight-chain paraffin such as pentane, hexane or higher paraffins having preferably from 5 to 10 carbon atoms per molecule. In addition, it is possible to use relatively low boiling olefins, as suitable solvents, having from 7 to 10 carbon atoms per molecule such as heptene, octene, nonene and decene. In general, the proper selection of a suitable diluent or solvent is not critical, although it is preferred that the solvent have a boiling end-point which is below the initial boiling point of the hydrocarbon oil treated. A solvent-oil ratio from between about 1:1 and about 2:1 is satisfactory.

As indicated above, the thus diluted liquid mixture is intermixed with a solid adsorbent in the presence of heat sufficiently high to permit the adsorbent to withdraw the color-imparting metallo-organic compounds from the wax. In this respect, the diluted liquid mixture percolates through the solid adsorbent in the presence of induced heat, such as steam, at a temperature between about 200° F. and about 350° F., which is normally sufficient to permit the adsorbent to withdraw or adsorb the aforementioned metallo-organic compounds from the wax. The intermixing of wax and adsorbent may be accomplished by simple agitation, stirring, or centrifuging, and may be conducted in any suitable open or closed vessel, although a closed adsorption chamber, which may be heated or into which steam may be introduced, is preferred. The solid adsorbent employed is preferably a solid siliceous adsorbent such as an acid-treated bentonite clay, e. g., Super Filtrol, natural clays which may be treated to improve their adsorbent properties, silica gel, or synthetic silica-alumina complexes. Other adsorbents may also be advantageously employed such as solid carbonaceous adsorbents, e. g., wood charcoal, activated carbon from various sources, and carbonaceous adsorbents from animal sources such as bone black. Still other suitable adsorbents may also be employed such as activated alumina.

In certain instances, the waxy product obtained by the aforementioned catalytic hydrogenation of carbon oxides may also include oxygenated organic compounds such as aldehydes having 2 or more carbon atoms per molecule. These aldehyde components upon being subjected to the aforementioned treatment with the heated adsorbent, tend to polymerize and form highly colored gummy or resinous compounds. These compounds, however, tend to be retained in the adsorbent and are not taken along with the wax upon subsequent percolation.

The intermixing of the waxy product and solvent or diluent, as described above, is conducted for varying periods of time in order to insure the maximum adsorption of metallo-organic compounds or formed aldehyde polymers, by the adsorbent, followed by percolation or filtration of the thus-partially decolored wax; and if desired, the filtrate may be subjected to further successive treatments with the adsorbent (the separated filtrate in each such treatment being subjected to further intermixing with fresh adsorbent, until no further improvement in color is obtained), as disclosed in the examples hereinafter given, to obtain a partially decolorized wax, substantially free from the aforementioned metallo-organic compounds, filtration being conducted with conventional apparatus known to those skilled in the art, such as filter presses, centrifuges and the like.

The filtrate obtained from the aforementioned treatment with the adsorbent comprises the waxy product containing the solvent and color-imparting unsaturated hydrocarbons, i. e., olefins and possibly acetylenes. It is preferable that the solvent be removed from the wax before further treatment for the removal of color-imparting unsaturated components. Accordingly, the wax is next distilled to obtain the separation of solvent as a relatively low boiling fraction, which may be recycled if so desired to the initial wax solvent contact step. As indicated above, the solvent-free partially decolorized wax obtained as a relatively high boiling fraction from the aforementioned distillation step and containing color-imparting unsaturated components, is next subjected to hydrogenation in the presence of a suitable hydrogenation catalyst in order to convert the unsaturated components (olefins and possible acetylenes), to their corresponding paraffins. Hydrogenation is conducted with conventional apparatus, such as a hydrogenation reactor, within the broad temperature range of between about 150° F. and about 650° F. and at pressures within the broad range of between about 75 and 1500 pounds per square inch gauge, for a residence time of at least about 30 minutes, the particular temperature, pressure and residence time varying with the type of hydrogenation catalyst employed. Various hydrogenation catalysts effective for converting olefins or acetylenes, having from 18 to 30 carbon atoms per molecule, may be successfully utilized for this purpose. Hence, such catalysts may be employed as nickel, iron, copper oxide, chromium oxide, copper chromite, zinc oxide, zinc chromite, ruthenium, molybdenum, silver, platinum or cobalt, supported or unsupported, or a mixture of such catalysts, employed as a fixed-bed, fluid-bed, or slurry, with a fixed-bed catalyst being preferred. Of these catalysts, those comprising a supported nickel, supported or unsupported iron, or a mixture of copper oxide and chromium oxide in a ratio of 1:2, are particularly desirable. Where the catalyst comprises supported nickel, it is preferred to conduct the hydrogenation within the narrow temperature and pressure ranges of between about 200° F. and about 400° F., and between about 300 and 1000 pounds per square inch gauge, for a residence time of at least about 30 minutes. Where the catalyst comprises iron, hydrogenation is preferably conducted at a temperature between about 400° F. and about 600° F., at a pressure between about 500 and 1000 pounds per square inch gauge, and for a residence time of at least about 60 minutes. Where the catalyst comprises copper oxide-chromium oxide, in the above-mentioned ratio of about 1:2, hydrogenation is preferably conducted at a temperature between about 250° F. and about 500° F., at a pressure between about 500 and about 1000 pounds per square inch gauge, and for a residence time of at least about 30 minutes.

Following the above-mentioned hydrogenation of unsaturated color-producing olefins, acetylenes or both, there is obtained as a final product of the process, a purified paraffin wax of improved color, having a clear whitish appearance of markedly high commercial value. The wax thus produced possesses stability of color and will not darken after long standing. In addition, characteristic odors imparted by catalysts, such as iron, or by traces of odorous oxygenated organic compounds such as aldehydes and ketones (the latter being hydrogenated to their corresponding alcohols) to the untreated oil from which the wax product of the present invention is derived, in the aforementioned catalytic hydrogenation of oxides of carbon, is found to be no longer present.

For a fuller understanding of the method of the present invention, the accompanying drawing illustrates diagrammatically, an elevational view of one form of the apparatus employed and capable of carrying out one embodiment of the process of the present invention. While the invention will be described by reference to the embodiment illustrated, it should be noted that it is not intended that it be limited to the embodiment as illustrated, but is capable of other embodiments which may extend beyond the scope of the apparatus illustrated. Some of the mechanical elements necessary to effect the transfer of liquids and vapors to maintain the conditions of temperature and pressure necessary to carry out the function of the apparatus, are omitted in order to simplify the description. It will be understood, however, that equipment of this nature is necessary and will be supplied by those skilled in the art.

Referring to the drawing, a synthesis feed comprising a reaction mixture of hydrogen and an oxide of carbon, at varying mol ratios, such as 2:1, is supplied through line 10 and transferred through this line to a synthesis reaction vessel, represented in the drawing by reactor 11. In reactor 11, the reaction mixture is contacted with a hydrogenation catalyst, such as a reduced iron or cobalt catalyst, at temperatures varying between about 300° F. and about 700° F. and at pressures varying between about atmospheric pressure and about 500 pounds per square inch, and is carried out according to conventional fixed-bed or fluid-bed operations. The resulting reaction product obtained from reactor 11 is withdrawn through line 12. This product is in the vapor form substantially as it comes from the reactor within the aforementioned temperature range, containing water, methane and higher paraffins, unsaturated hydrocarbons comprising olefins (and which may also include acetylenes) and oxygenated organic compounds comprising $C_2$ and higher acids, methanol and higher alcohols, and may also comprise $C_2$ and higher aldehydes, ketones and esters depending upon the conditions of the reaction. This reaction effluent from reactor 11 is next transferred through line 12 to a cooler 13 in which it is cooled to a temperature of approximately 300° F. in order to effect condensation of normally liquid paraffins and olefins, comprising the final wax product to be recovered, while both relatively lower boiling oxygenated organic compounds and other hydrocarbons are still maintained in the vapor state. From cooler 13, the mixture of liquid wax and vapors of hydrocarbons and oxygenated organic compounds is withdrawn through line 14 and transferred through this line to a separator 15. In separator 15 the aforementioned vapors of wax-free hydrocarbons and oxygenated organic compounds are withdrawn through line 16 for further use or treatment outside the scope of the present process. The lower liquid wax phase in separator 15 is withdrawn through line 17. At this point, it should be noted that water introduced into separator 15 through line 14, may be present either as a liquid or a vapor depending upon the pressure conditions present. If present as a vapor, such water will be recovered with the wax-free chemicals withdrawn through line 16. However, if water is present as a liquid, it will be removed with the liquid waxes in line 17. In the latter event, the water may be removed from the wax portion by transferring the entire mixture in line 17 to another separator (not shown in the drawing) for the removal of water, prior to subsequent treatment of the wax.

The liquid wax thus removed through line 17 comprises paraffins and color-producing metallic organo compounds and olefins, as previously described. This liquid wax is next contacted with one or more of the aforementioned suitable solvents or diluents, such as a process naphtha. For this purpose, the colored liquid wax is transferred through line 17 to a mixing vessel, represented by mixer 18, in which the wax is contacted with the diluent, introduced through line 19. Following the blending of diluent and colored wax in mixer 18, the resulting mixture is withdrawn through line 20 and transferred through this line to a suitable conventional mixing vessel, represented by adsorption chamber 21, in which the diluted colored wax or oil product is intermixed or brought into contact in the presence of heat with one or more of the aforementioned solid sorbents, such as an acid-treated bentonite clay, to withdraw the metallic organic compounds present. The aforementioned contact of sorbent with the diluted colored oil or wax is conducted at a temperature between about 200° F. and about 350° F. In order to supply sufficient heat for this purpose, steam is introduced at an upper point in chamber 21 through line 22. In addition to adsorbing the aforementioned organo metallic compounds present in the diluted colored oil in chamber 21, the solid sorbent will also adsorb any gummy aldehyde polymers that may be formed in this chamber.

After treatment of the colored oil or wax in chamber 21 for a period of time sufficient to insure the maximum adsorption of metallic organo compounds and formed aldehydes polymers by the sorbent, the thus treated wax is permitted to filter or percolate through the sorbent material and is withdrawn through line 23. As previously described, the filtrate may be subjected to further successive treatments with sorbent, the separated filtrate in each such treatment being returned to the absorption chamber for further adsorption with the solvent until no further improvement in color is obtained. There is thus obtained in line 23 a partially decolorized diluted oil or wax containing color-producing olefins or additional color-producing unsaturated compounds, substantially free of the aforementioned metallic organo compounds. In order to remove the diluent present in this partially decolorized oil prior to further treatment of color-producing unsaturated components, the oil is next transferred to a distillation tower 24 via line 23. Tower 24 is heated under proper conditions of temperature and pressure effective to distill overhead the relatively low boiling diluent which is withdrawn through line 25 and which may be recycled through this line, via line 19 with which line 25 connects, for further use in mixer 18 in the process hereinbefore described.

The resulting diluent-free partially decolorized oil obtained from tower 24 and containing color-producing olefins and other unsaturated compounds, and small quantities of undesirable oxygenated organic compounds, such as aldehydes, is next subjected to hydrogenation in order to convert these unsaturated components to their corresponding paraffins. For this purpose the oil is next transferred from tower 24 through line 26 to a hydrogenation reactor 27. In reactor 27 the oil is next subjected to hydrogenation at a suitable temperature within the aforementioned broad range of between about 150° F. and about 650° F., and at a suitable pressure within the aforementioned broad range of between about 75 and 1500 pounds per square inch gauge, for a residence time of least about 30 minutes, in the presence of one or more of the aforementioned hydrogenation catalysts, such as nickel, iron, or copper oxide-chromium oxide, in order to convert olefins present in the oil to their corresponding paraffins. Hydrogen thus employed is introduced into reactor 27 through line 28.

The effluent from reactor 27 comprises a purified paraffin wax of improved color, free of metallic organo compounds and color-producing olefins or acetylenes. This effluent is withdrawn through line 29, cooled in condenser 30, and transferred through line 31 to a separator 32. In separator 32 separation is obtained between the decolorized wax product, which is withdrawn as a product of the process through line 33, and free hydrogen which is recycled to reactor 27 through line 34, via line 28 with which line 34 connects.

The following examples will serve to illustrate, but are not intended in any way to unduly limit the process of the present invention.

*Example I*

100 grams of a dark greenish-brown waxy oil product, obtained as a liquid fraction from the aforementioned condensation of the reaction effluent produced in the hydrogenation of carbon monoxide with an iron catalyst, was employed as a starting material. This oil was found to have the following characteristics:

| | |
|---|---|
| Gravity °API | 32 |
| Distillation (ASTM): | |
| IBP—°F. | 422 |
| 5% | 615 |
| 10% | 644 |
| 20% | 667 |
| Br. No.—gm./100 gm | 26.6 |

This waxy product was found to contain approximately 49% paraffin wax, having a melting point of 159° F., and was diluted with 200 cc. of heavy (East Texas) naphtha as a diluent. This diluent was a straight-run naphtha of about 50–60° API gravity, an initial boiling point (ASTM) of 300–350° F. and a final boiling point (ASTM) of 400–440° F. The mixture was agitated until uniform, and 21 grams of acid-treated bentonite clay (Super Filtrol) previously dried at 220° F., was added and the mixture was heated to 200° F. for three hours with continuous mixing. The spent clay was then separated by filtration using a steam jacketed Buckner funnel. 21 grams of fresh clay was then added and the mixture was stirred at 200° F. for one hour. The treatment was repeated a third and fourth time with 21 grams of clay being added, and the treatment with each fresh batch of clay was carried out for one-half hour at 200° F.

The results of the above-mentioned four treatments indicated a color change from the original dark greenish-brown to a bright orange-yellow, while the clay after each treatment appeared almost black. This partially decolorized waxy solution was next hydrogenated in a 1600 cc. pressure bomb according to the following procedure.

49 grams of the thus clay-treated oil was charged to the bomb with approximately 8.5 grams of 750° F. reduced catalyst. This catalyst consisted of precipitated nickel on kieselguhr promoted by a small quantity of manganese and alumina. The conditions under which hydrogenation was carried out were 1000 pounds per square inch gauge, 300° F. temperature, for a residence time of three hours in the shaker apparatus. 43.5 grams of filtered oil product were recovered, while 12 grams of oily catalyst were also discharged. The waxy oil was white in color as compared to the original oil and wax mixture. Analysis showed the final oil product to contain 22% of a white wax which melted at 157° F.

*Example II*

The procedure described in Example I was repeated. However, 300 grams of the same waxy oil-product starting material was employed and diluted with 600 cc. of a 350–400° F. fraction of a clear low molecular weight paraffinic synthetic oil, produced by the hydrogenation of carbon monoxide with a cobalt catalyst. Three preliminary treatments were completed using 30 grams of the clay (Super Filtrol) for each treatment with agitation at 200° F. for 15 minute periods. There next followed six treatments using 60 grams of the clay with agitation at 200° F. for 15 minute periods. A gradual improvement in color was evident during the first five treatments, but no particular improvement was realized during the final four treatments.

147 grams of a light orange solution of wax was thus obtained, and was also subjected to hydrogenation under similar conditions of temperature, pressure and residence time, and employing the same catalyst, as in Example I, except that the quantity of catalyst employed was increased to 25.2 grams. 127.5 grams of filtered oil product were recovered, while 36.2 grams of oily catalyst were also discharged. The waxy oil thus recovered was white in color and similar in composition to the final wax product obtained in Example I.

While a particular embodiment of the process of the present invention has been described, for the purpose of illustration, it should be understood that various modifications and adaptations thereof which will be obvious to one skilled in the art, may be made without departing from the spirit of the invention.

I claim:

1. A method for refining a liquid waxy product produced by condensing the product of hydrogenation of oxides of carbon in the presence of a hydrogenation catalyst at a temperature between about 300° F. and about 700° F. and at a pressure between about atmospheric pressure and about 500 pounds per square inch, said waxy product containing color-imparting metallo-organic compounds and color-imparting unsaturated hydrocarbons, which comprises: dissolving said waxy product in a solvent; contacting the resulting solution at elevated temperature with a solid adsorbent to separate from said solution said color-imparting metallo-organic compounds; withdrawing the solution from contact with said adsorbent; and further decolorizing the thus partially decolorized waxy product by subjecting said product to hydrogenation in the presence of a hydrogenation catalyst at a temperature between about 150° F. and about 400° F. and at a pressure between about 75 and about 1500 pounds per square inch gauge for a residence time of at least 30 minutes to convert unsaturated color-imparting hydrocarbons to their corresponding paraffins.

2. A method for refining a liquid waxy product produced by condensing the product of hydrogenation of oxides of carbon in the presence of a hydrogenation catalyst at a temperature between about 300° F. and about 700° F. and at a pressure between about atmospheric pressure and about 500 pounds per square inch, said waxy product containing color-imparting metallo-organic compounds and color-imparting unsaturated hydrocarbons, which comprises: dissolving said waxy product in a solvent; contacting the resulting solution at a temperature between about 200° F. and about 350° F. with a solid adsorbent to separate from said solution said color-imparting metallo-organic compounds; withdrawing the solution from contact with said adsorbent; and further decolorizing the thus partially decolorized waxy product by subjecting said product to hydrogenation in the presence of a hydrogenation catalyst at a temperature between about 150° F. and about 400° F. and at a pressure between about 75 and about 1500 pounds per square inch gauge for a residence time of at least 30 minutes to convert unsaturated color-imparting hydrocarbons to their corresponding paraffins.

3. A method for refining a liquid waxy product produced by condensing the product of hydrogenation of oxides of carbon in the presence of a hydrogenation catalyst at a temperature between about 300° F. and about 700° F. and at a pressure between about atmospheric pressure and about 500 pounds per square inch, said waxy product containing color-imparting metallo-organic compounds and color-imparting unsaturated hydrocarbons, which comprises: dissolving said waxy product in a solvent; contacting the resulting solution at elevated temperature with a solid adsorbent to separate from said solution said color-imparting metallo-organic compounds; withdrawing the solution from contact with said adsorbent; and further decolorizing the thus partially decolorized waxy product by subjecting said product to hydrogenation in the presence of a hydrogenation catalyst at a temperature between about 200° F. and about 400° F. and at a pressure between about 75 and about 1500 pounds per square inch gauge for a residence time of at least 30 minutes to convert unsaturated color-imparting hydrocarbons to their corresponding paraffins.

4. A method for refining a liquid waxy product produced by condensing the product of hydrogenation of oxides of carbon in the presence of a hydrogenation catalyst at a temperature between about 300° F. and about 700° F. and at a pressure between about atmospheric pressure and about 500 pounds per square inch, said waxy product containing color-imparting metallo-organic compounds and color-imparting unsaturated hydrocarbons, which comprises: dissolving said waxy product in a solvent; contacting the resulting solution at a temperature between about 200° F. and about 350° F. with a solid adsorbent to separate from said solution said color-imparting metallo-organic compounds; withdrawing the solution from contact with said adsorbent; and further decolorizing the thus partially decolorized waxy product by subjecting said product to hydrogenation in the presence of a hydrogenation catalyst at a temperature between about 200° F. and about 400° F. and at a pressure between about 75 and about 1500 pounds per square inch gauge for a residence time of at least 30 minutes to convert unsaturated color-imparting hydrocarbons to their corresponding paraffins.

5. A method for refining a liquid waxy product produced by condensing the product of hydrogenation of oxides of carbon in the presence of a hydrogenation catalyst at a temperature between about 300° F. and about 700° F. and at a pressure between about atmospheric pressure and about 500 pounds per square inch, said waxy product containing color-imparting metallo-organic compounds and color-imparting unsaturated hydrocarbons, which comprises: dissolving said waxy product in a solvent; contacting the resulting solution at elevated temperature with a solid adsorbent to separate from said solution said color-imparting metallo-organic compounds; withdrawing the solution from contact with said adsorbent; and further decolorizing the thus partially decolorized waxy product by subjecting said product to hydrogenation in the presence of a hydrogenation catalyst at a temperature between about 150° F. and about 400° F. and at a pressure between about 500 and about 1000 pounds per square inch gauge for a residence time of at least 30 minutes to convert unsaturated color-imparting hydrocarbons to their corresponding paraffins.

6. A method for refining a liquid waxy product produced by condensing the product of hydrogenation of oxides of carbon in the presence of a hydrogenation catalyst at a temperature between about 300° F. and about 700° F. and at a pressure between about atmospheric pressure and about 500 pounds per square inch, said waxy product containing color-imparting metallo-organic compounds and color-imparting unsaturated hydrocarbons, which comprises: dissolving said waxy product in a solvent; contacting the resulting solution at elevated temperature with a solid siliceous adsorbent to separate from said solution said color-imparting metallo-organic compounds; withdrawing the solution from contact with said adsorbent; and further decolorizing the thus partially decolorized waxy product by subjecting said product to hydrogenation in the presence of a hydrogenation catalyst at a temperature between about 150° F. and about 400° F. and at a pressure between about 75 and about 1500 pounds per square inch gauge for a residence time of at least 30 minutes to convert unsaturated color-imparting hydrocarbons to their corresponding paraffins.

7. A method for refining a liquid waxy product produced by condensing the product of hydrogenation of oxides of carbon in the presence of a hydrogenation catalyst at a temperature between about 300° F. and about 700° F. and at a pressure between about atmospheric pressure and about 500 pounds per square inch, said waxy product containing color-imparting metallo-organic compounds and color-imparting unsaturated hydrocarbons, which comprises: dissolving said waxy product in a solvent; contacting the resulting solution at elevated temperature with a solid siliceous adsorbent comprising an acid treated bentonite clay to separate from said solution said color-imparting metallo-organic compounds; withdrawing the solution from contact with said adsorbent; and further decolorizing the thus partially decolorized waxy product by subjecting said product to hydrogenation in the presence of a hydrogenation catalyst at a temperature between about 150° F. and about 400° F. and at a pressure between about 75 and about 1500 pounds per suare inch gauge for a residence time of at least 30 minutes to convert unsaturated color-imparting hydrocarbons to their corresponding paraffins.

8. A method for refining a liquid waxy product produced by condensing the product of hydrogenation of oxides of carbon in the presence of a hydrogenation catalyst at a temperature between about 300° F. and about 700° F. and at a pressure between about atmospheric pressure and about 500 pounds per square inch, said waxy product containing color-imparting metallo-organic compounds and color-imparting unsaturated hydrocarbons, which comprises: dissolving said waxy product in a solvent; contacting the resulting solution at elevated temperature with a solid carbonaceous adsorbent comprising activated carbon to separate from said solution said color-imparting metallo-organic compounds; withdrawing the solution from contact with said adsorbent; and further decolorizing the thus partially decolorized waxy product by subjecting said product to hydrogenation in the presence of a hydrogenation catalyst at a temperature between about 150° F. and about 400° F. and at a pressure between about 75 and about 1500 pounds per square inch gauge for a residence time of at least 30 minutes to convert unsaturated color-imparting hydrocarbons to their corresponding paraffins.

9. A method for refining a liquid waxy product produced by condensing the product of hydrogenation of oxides of carbon in the presence of an iron catalyst at a temperature between about 300° F. and about 700° F. and at a pressure between about atmospheric pressure and about 500 pounds per square inch, said waxy product containing color-imparting ferro-organic compounds and color-imparting olefins, which comprises: dissolving said waxy product in naphtha; contacting the resulting solution at a temperature between about 200° F. and about 350° F. with a solid adsorbent comprising an acid-treated bentonite clay to separate from said solution said color-imparting ferro-organic compounds; withdrawing the solution from contact with said adsorbent; and further decolorizing the thus partially decolorized waxy product by subjecting said product to hydrogenation in the presence of a supported nickel catalyst at a temperature between about 200° F. and about 400° F. and at a pressure between about 300 and about 1000 pounds per square inch gauge for a residence time of at least 30 minutes to convert color-imparting olefins to their corresponding paraffins.

ROBERT T. LOUGHRAN.

References Cited in the file of this patent

UNITED STATES PATENTS

| Number | Name | Date |
|---|---|---|
| 1,930,468 | Cunradi et al. | Oct. 17, 1933 |
| 1,973,833 | Wietzel et al. | Sept. 18, 1934 |
| 1,989,626 | Pangs et al. | Jan. 29, 1935 |
| 2,116,061 | Dorrer | May 3, 1938 |
| 2,273,726 | Renshaw | Feb. 17, 1942 |
| 2,574,331 | Knox, Jr. | Nov. 6, 1951 |

OTHER REFERENCES

Koch et al., Investigation of the Solid Paraffin Hydrocarbons Produced in the Benzene Synthesis by the F-T Process. C. A. 35-3803.

Wiel et al., Synthetic Petroleum from the Synthine Process. Pages 130-133.